3,639,603
METHOD AND COMPOSITION EMPLOYING MIXED ETHER COMPOUNDS FOR ALLEVIATING CARDIAC ARRHYTHMIAS
Franklin N. Marshall, Indianapolis, Ind., assignor to The Dow Chemical Company, Midland, Mich.
No Drawing. Filed Mar. 6, 1969, Ser. No. 804,984
Int. Cl. A61k 27/00
U.S. Cl. 424—250          8 Claims

ABSTRACT OF THE DISCLOSURE

A method useful for alleviating cardiac arrhythmias such as tachycardias in animals by administering to arrhythmic mammals an antiarrhythmic amount of a mixed ether compound such as 2-[(4-amino-2,6-dibromophenoxy)methyl]-2-imidazoline or a pharmaceutically-acceptable salt thereof.

SUMMARY OF THE INVENTION

This invention is concerned with a method and compositions for treating cardiac arrhythmias in animals and is particularly directed to a method and composition useful for treating arrhythmic mammals by the administration thereto of an antiarrhythmic amount of a mixed ether compound of the formula

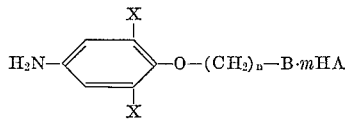

wherein X represents chlorine, bromine or iodine, B represents a heterocyclic basic moiety containing two nitrogen ring atoms and selected from 2-imidazolin-2-yl, piperazin-1-yl and 4-methyl-piperazin-1-yl, $n$ represents one of the integers 1 and 2, $m$ represents one of the integers 0, 1 and 2 and HA represents a chemical equivalent of a pharmaceutically-acceptable acid.

It is an object of the invention to provide a method for the treatment of cardiac arrhythmias in animals. It is another object of the invention to provide novel compositions which can be employed to combat cardiac arrythmias in mammals. It is a further object of the invention to provide pharmaceutical compositions comprising one or more antiarrhythmic compound of high potency. Further objects and advantages will become apparent upon consideration of the following specification and claims.

It has been found that mixed ether compounds corresponding to the above formula and the salts thereof with pharmaceutically-acceptable acids have powerful antiarrhythmic activity when administered to arrhythmic animals, and in particular, to arrhythmic mammals. As employed herein, the phrase "pharmaceutically-acceptable acids" refers to acids forming non-toxic acid addition salts with the mixed ether compounds, the anions of which are relatively innocuous to the animal at dosages consistent with good antiarrhythmic activity so that the beneficial effects of the free base are not vitiated by side effects ascribable to the anions. Appropriate pharmaceutically-acceptable acids include mineral acids such as hydrochloric, hydrobromic, sulfuric and nitric acid and organic acids such as acetic, lactic, maleic, succinic, fumaric, glutaric, citric, malic and tartaric acids and the like.

The mixed ether compounds employed in the method and composition of the invention are crystalline solids which are soluble in a variety of organic solvents such as chlorinated hydrocarbons, chlorinated benzenes and alkylbenzenes and only slightly soluble in water. The pharmaceutically-acceptable salts of the compounds are crystalline solids which are soluble in water and slightly soluble in organic solvents such as halobenzenes, ether and alcohols.

The mixed ether compounds wherein B is 2-imidazolin-2-yl can be prepared by the reaction of a 4-acetamido-2,6-dihalophenoxyacetonitrile with ethylenediamine monotosylate according to known procedures for preparing 2-substituted 2-imidazolines, followed by hydrolysis in aqueous mineral acid to obtain the 2-[(4-amino-2,6-dihalophenoxy)methyl]-2-imidazoline compound. In a convenient procedure, the reactants are contacted and mixed in an inert organic solvent such as 1,2-dichlorobenzene and the mixture is heated at the boiling point under reflux for a few hours. The 2-[(4-acetamido-2,6-dihalophenoxy) methyl]-2-imidazoline intermediate precipitates in the reaction mixture as the tosylate salt and can be separated and purified by conventional procedures such as filtration and washing followed by recrystallization. The free base compound can be liberated from the tosylate salt by conventional procedures such as treatment with excess base.

The tosylate salt or the free base of the intermediate is hydrolyzed in excess aqueous acid. The hydrolysis takes place in a few hours at a temperature of about 90°–100° C. In the preferred procedure, hydrochloric acid is employed as the acid medium. The product precipitates in the acidic reaction mixture as the hydrochloride salt and can be separated and purified by conventional procedures such as filtration, washing and recrystallization. The product can be further purified or it can be converted to the free base.

The mixed ether compounds wherein B is piperazin-1-yl or 4-methylpiperazin-1-yl are prepared by the reaction of a 2-(4-acetamido-2,6-dihalophenoxy)-1-bromoethane with piperazine or N-methylpiperazine, followed by hydrolysis in aqueous mineral acid in a procedure analogous to that disclosed in U.S. Pat. No. 3,389,171. In a convenient procedure, a 2-(4-acetamido-2,6-dihalophenoxy)-1-bromoethane is reacted with excess piperazine or N-methylpiperazine in an inert solvent such as methanol and at a temperature of about 50°–70° C. The intermediate compound is separated by evaporation and dissolved in excess aqueous hydrochloric acid and the solution is heated at a temperature of about 80°–105° C. for several hours. The product is separated as the dihydrochloride salt by conventional procedures such as evaporation, concentrating the solution followed by cooling to precipitate the product and the like.

The free base mixed ether compounds can be prepared by hydrolysis of the pharmaceutically-acceptable salts in aqueous base and can be separated by extraction with organic solvents and purified by recrystallization. The pharmaceutically-acceptable salts of the mixed ether compounds can be conveniently prepared by dissolving the mixed ether-free base compound in an alcohol and adding an excess of an alcoholic solution of an acid such as hydrochloric acid, acetic acid, maleic acid or the like to precipitate the pharmaceutically-acceptable salt. The salt can be separated by filtration and purified by recrystallization.

In accordance with the invention, an antiarrhythmic amount of a mixed ether compound of the invention or a pharmaceutically-acceptable salt thereof is administered to an arrhythmic animal. The terms "arrhythmic" and "arrhythmia" as employed herein refer to irregular cardiac activity characterized by irregular beating of the heart, that is, non-rhythmic heart beat. Such arrhythmias involve substantial departures from the regular, substantially sinus (sinusoidal) normal heart beat. Arrhythmias are generally beyond the normal increased, but still substantially regular, heart beat rate resulting from physical activity. The term is inclusive of the conditions described by terms such as ventricular fibrillation, ventricular tachycardia, atrioventricular nodal beats, auricular flutter, auricular fibrillation or premature venticular contractions. The terms "arrhythmic animal" and "arrhythmic mammal," as employed in the present specification and claims, mean and refer to animals suffering cardiac arrhythmias. Such arrhythmias can be the result of physiological or pathological conditions, can be brought about by physical conditions such as electrical stimulation or physical injury or they can be brought about by pharmacological effects such as the administration of compounds such as digitalis or similar compounds such as ouabain, acetyl strophanthidin, deslanatoside C or digitoxin; epinephrine; ergot; chloroform; cyclopropane and the like having cardiac stimulant and arrhythmia-inducing activity or side effects.

In the practice of the invention, the mixed ether compound is normally incorporated in a pharmaceutical carrier and the resulting composition is administered internally to an arrhythmic animal. In the present specification and claims, "pharmaceutical carrier" refers to known pharmaceutical excipients which are substantially non-toxic and non-sensitizing at dosage levels consistent with good antiarrhythmic activity. The active ingredient is preferably administered both parenterally in the form of liquid injectable solutions or suspensions, and orally in the form of solid compositions which can be prepared by known techniques such as tableting and encapsulation. Suitable pharmaceutical carriers which can be employed for formulating the solid compositions include starch, lactose, glucose, sucrose, gelatin, powdered licorice, malt, rice flour, chalk, silica gel, hydroxyethyl cellulose, hydroxypropyl cellulose, magnesium carbonate, magnesium stearate and the like and compatible mixtures thereof. The mixed ether compound and the pharmaceutically-acceptable salts thereof can also be formulated as liquid compositions including syrups, elixirs, suspensions and emulsions for oral administration. Among the liquid pharmaceutical carriers which can be employed for orally-administered compositions are ethanol, water, saline, glucose syrup, syrup of acacia, mucilage of tragacanth, propylene glycol, polyethylene glycols, peanut oil, wheat germ oil, sunflower seed oil or corn oil and the like and compatible mixtures thereof. Oarlly-ingestable emulsions are prepared with the aid of emulsifying agents such as lectithin, sorbitan trioleate, polyoxyethylene sorbitan monooleate and natural gums such as gum acacia and gum tragacanth. Suspensions are prepared with the aid of suspending agents such as polyethylene oxide condensation products of alkylphenols or fatty acids or fatty alcohols, or cellulose derivatives such as carboxymethyl cellulose or hydroxypropylmethyl cellulose. The compositions can also contain sweetening agents such as calcium cyclamate, flavoring agents such as caramel, coloring materials, preservatives and the like.

Injectable compositions adapted for parenteral administration such as intramuscular, subcutaneous or, preferably, intravenous injection can be prepared with carriers such as water, normal saline solutions, Ringer's injection, lactated Ringer's injection, dextrose solutions, ethanol, propylene glycol, liquid polyethylene glycols, fixed vegetable oils such as corn oil, peanut oil or cottonseed oil, ethyl oleate, isopropyl myristate and the like. The injectable compositions can also contain other materials such as preservatives, buffers and the like. The selection of the exact pharmaceutical carrier to be employed in any given circumstance can be carried out by routine and conventional range finding operations to arrive at formulations having the desired characteristics of physical form, ease of administration in a desired route, storage stability, etc.

The antiarrhythmic amount of the mixed ether compound to be administered to an arrhythmic animal can vary depending upon such factors as the severity of the arrhythmia exhibited, the method and frequency of administration, the exact antiarrhythmic effect to be produced, whether or not the free base or a pharmaceutically-acceptable salt of the mixed ether compound is employed and the species, size, weight, age and physical condition of the particular animal being treated. In general, when the animal is actively exhibiting arrhythmia, it is preferred to administer the compound at an antiarrhythmic dosage rate sufficient to bring about a complete conversion of the arrhythmia to normal sinus cardiac activity. In such operations, the active compound is preferably introduced directly into the cardiovascular system of the animal to provide an antiarrhythmic concentration thereof in the blood sufficient to alleviate the arrhythmia. In a convenient procedure, the mixed ether compound is administered by intravenous injection at an initial antiarrhythmic dosage less than that required to fully convert the arrhythmia to normal rhythm, and the heartbeat of the animal is monitored as the amount of compound administered is gradually increased over a period of minutes until an antiarrhythmic amount sufficient to fully convert the arrhythmia to rhythmic cardiac activity has been administered. It is then preferred to supply the compound in periodic maintenance antiarrhythmic dosages, such administration being either by the same parenteral route, or by administration of larger antiarrhythmic dosages by another route such as orally. The maintenance antiarrhythmic dosage and mode of administration are selected to provide a more-or-less continuous antiarrhythmic concentration of the mixed ether compound in the cardiovascular system, such concentration being sufficient to inhibit further arrhythmia. In general, the mixed ether compound can be administered intravenously in initial dosages of from about 250 or less to about 10,000 or more micrograms per kilogram of animal body weight, providing antiarrhythmic concentrations in the cardiovascular system of about 20 or lower to about 800 or more micrograms per liter of blood. Maintenance dosages can vary widely depending upon a variety of factors such as the time and frequency of administration, the exact mixed ether compound or compounds employed, the condition, size, age and species of the animal, the route of administration selected, the type of dosage form employed, the type and cause of the arrhythmia, and the length of time during which a maintenance dose is desired. In cases in which there is little or no likelihood of recurrence of arrhythmia once conversion has been brought about, the maintenance dosage can comprise a continuation of the initial intravenous antiarrhythmic dosage for a relatively brief period. Maintenance dosages can be administered by single or multiple doses provided that the compounds are administered in an amount sufficient to provide an antiarrhythmic concentration in the blood and substantially to alleviate cardiac arrhythmia.

DESCRIPTION OF THE PREFERRED EMBODIMENTS

The following examples illustrate the invention but are not to be construed as limiting the same.

EXAMPLE 1

2-[(4-acetamido - 2,6 - dibromophenoxy)methyl]-2-imidazoline hydrochloride, having a molecular weight of 427.5, melting at 235°–236° C., is prepared by mixing together equimolar proportions of 4-acetamido-2,6-dibromophenoxyacetonitrile and ethylenediamine monotosylate, separating the tosylate salt, liberating the free base by treatment with sodium hydroxide and preparing the hydrochloride by treatment with hydrochloric acid.

2 - [(4-acetamido - 2,6 - dibromophenoxy)methyl]-2-imidazoline hydrochloride (34.2 grams; 0.08 mole) is dissolved in 100 milliliters of aqueous 5 normal hydrochloric acid. The solution is heated on a steam bath for about 2.5 hours, during which time a precipitate forms. The mixture is cooled and filtered and the filter cake is washed with aqueous 5 normal hydrochloric acid. The filter cake is dried and the 2-[(4-amino-2,6-dibromophenoxy)methyl]-2-imidazoline dihydrochloride product is found to melt at 237°–239° C. The structure of the product is confirmed by nuclear magnetic resonance spectroscopy.

EXAMPLE 2

2 - [(4-acetamido - 2,6 - dichlorophenoxy)methyl]-2-imidazoline hydrochloride, having a molecular weight of 338.7, is prepared by mixing together equimolar proportions of 4-acetamido - 2,6 - dichlorophenoxyacetonitrile and ethylenediamine monotosylate, separating the tosylate salt by filtration, liberating the free base with sodium hydroxide and treating the free base with alcoholic hydrochloric acid to precipitate the hydrochloride salt.

2 - [(4-amino - 2,6 - dichlorophenoxy)methyl]-2-imidazoline dihydrochloride, melting at 246°–247° C., is prepared by dissolving 2-[(-acetamido-2,6-dichlorophenoxy)methyl]-2-imidazoline hydrochloride in excess aqueous 5 normal hydrochloric acid and heating the solution on a steam bath for about three hours.

EXAMPLE 3

2 - (4-acetamido - 2,6 - dibromophenoxy)-1-bromoethane is mixed with excess N-methylpiperazine in methanol and the mixture is heated for about 36 hours at a temperature of about 60° C. The mixture is evaporated in vacuo, extracted with methylene chloride and water and the methylene chloride extract is evaporated to dryness. The residual 1-[2-(4-acetamido - 2,6 - dibromophenoxy)ethyl]-4-methylpiperazine is found to melt at 138°–140° C. The 1-[2-(4-acetamide - 2,6 - dibromophenoxy)ethyl]-4-methylpiperazine is treated with excess aqueous hydrogen chloride by a procedure similar to that described in Examples 1 and 2. The 1-[2-(4-amino - 2,6 - dibromophenoxy)ethyl]-4-methylpiperazine hydrochloride product is found to melt at 217°–219° C.

In substantially the same procedure, 1-[2-(4-amino-2,6 - dichlorophenoxy)ethyl]piperazine dihydrochloride, having a molecular weight of 363, is prepared by reacting 2-(4-acetamido-2,6-dichlorophenoxy)-1-bromoethane with excess piperazine and hydrolyzing the resulting intermediate with excess hydrochloric acid.

EXAMPLE 4

A dog is anesthetized by the intravenous administration of pentobarbital sodium at a dosage rate of 30 milligrams per kilogram. A femoral artery is cannulated with polyethylene tubing for measurements of blood pressure. A femoral vein is similarly cannulated for administration of ouabain and administration of the test compound. Hypodermic needle electrodes are employed for recording electrocardiograms.

Ventricular tachycardia is produced in the test dog according to the method of Lucchesi and Hardman (J. Pharmacol. Exptl. Therap., 132, 372, 1961) by the administration of ouabain. In such operations, ouabain is administered intravenously via the cannulated femoral vein at an initial dosage of 40 micrograms of ouabain per kilogram of animal body weight. The initial dosage of ouabain is supplemented after thirty minutes by 20 micrograms of ouabain per kilogram, and by 15 micrograms per kilogram thereafter until ventricular tachycardia is detected.

After ventricular tachycardia is observed, 2-[(4-amino-2,6 - dibromophenoxy)methyl] - 2-imidazoline dihydrochloride is administered intravenously by administration of a composition containing varying amounts of the pharmaceutically-acceptable salt of the mixed ether compound in sterile solution in water containing 0.9 percent sodium chloride. Each dose is administered slowly over a period of 15 to 30 seconds. The compound is administered at an initial dosage rate of 0.25 milligram of 2-[(4-amino-2,6 - dibromophenoxy)methyl] - 2-imidazoline dihydrochloride per kilogram of animal body weight. Blood pressure and electrocardiogram are observed for five minutes after administration. When a complete conversion from the arrhythmic condition to normal sinus rhythm is not observed within the five minute period, a second dose of 0.50 milligram of the test compound per kilogram is administered by a similar procedure and blood pressure and heart beat are similarly observed for five minutes. When complete conversion of the ventricular tachycardia to normal sinus rhythm is not observed, the dosage is increased two-fold every five minutes until complete conversion is obtained. The animal is then observed and the duration of the period of normal cardiac rhythm produced by administration of the test compound is recorded as the duration of antiarrhythmic activity. The termination of the period of normal activity is marked by the reappearance of ventricular tachycardia or fibrillation as indicated by the electrocardiogram observations. The change in mean arterial blood pressure and the change in rate of heart beats per minute produced by the administration of the recorded antiarrhythmic dosage of test compound sufficient to bring about a complete conversion of the ouabain-induced tachycardia is recorded.

In these operations, 2-[(4-amino-2,6-dibromophenoxy)methyl]-2-imidazoline dihydrochloride is found to produce a complete conversion of ventricular tachycardia when administered intravenously at an antiarrhythmic dose of 0.25 milligram per kilogram. Conversion to normal cardiac rhythm is obtained without the necessity of administering of the compound at a higher dosage rate. The duration of antiarrhythmic activity observed with such dosage rate is about 92 seconds. The administration of such antiarrhythmic dosage of the active compound is observed to produce a decrease in mean arterial blood pressure of 7 millimeters of mercury and a decrease in heartbeat rate of 48 beats per minute as compared to the blood pressure and heartbeat observed during the arrhythmatic condition prior to administration of the compound. Similar results have been observed with compounds known to be useful as antiarrhythmic agents. (Lucchesi et al., J. Pharmacol. Exptl. Therap., 132, 372, 1961).

EXAMPLE 5

In other representative operations carried out by the procedure of Example 4, 1-[2-(4-amino-2,6-dibromophenoxy)ethyl] - 4 - methylpiperazine hydrochloride is found to produce a complete conversion of ouabain-induced ventricular tachycardia in dogs when administered intravenously at an antiarrhythmic dose of 0.5 milligram per kilogram. The duration of antiarrhythmic activity observed with such dosage rate is 67 seconds. The administration of such antiarrhythmic dosage of the active compound is observed to produce an increase in mean arterial blood pressure of 6 millimeters of mercury and a decrease in heartbeat rate of 36 beats per minute as compared to the blood pressure and heartbeat observed during the arrhythmatic condition prior to administration of the compound.

EXAMPLE 6

Ten grams of 1 - [2 - (4 - amino-2-bromo-6-chlorophenoxy) - ethyl]piperazine acetate, 4 grams of 2 - [(4-amino - 2,6 - dibromophenoxy)methyl]-2-imidazoline, 62 grams of milk sugar, 3 grams of magnesium stearate and 20 grams of corn starch are intimately mixed together in conventional mixing apparatus. The mixture is filled into gelatin capsules in the amount of 0.4 gram per capsule. The capsules are thus adapted to provide a maintenance dosage of about 55 milligrams of the active ingredient to arrhythmic mammals.

Forty grams of 2 - [(4 - amino-2,6-dibromophenoxy)methyl]-2-imidazoline monohydrochloride, 25 grams of lactose, 30 grams of starch and 5 grams of powdered tragacanth are mixed intimately in conventional mixing apparatus. The mixture is filled into gelatin capsules in the amount of 750 milligrams per capsule and the capsules are then administered orally to mammals to combat cardiac arrhythmia.

EXAMPLE 7

410 grams of 2 - [(4 - amino-2,6-dibromophenoxy) methyl]-2-imidazoline diacetate are intimately mixed with 50 grams of magnesium stearate, 440 grams of alginic acid and 1050 grams of corn starch and the mixture is compressed into slugs. The slugs are broken into granules which are passed through an eight mesh screen and mixed with an additional 50 grams of magnesium stearate. The mixture is then compressed into tablets weighing 0.6 gram each. The tablets are administered orally to animals to combat arrhythmias.

EXAMPLE 8

Ten grams of 2-[(4-amino-2,6-dibromophenoxy)methyl]-2-imidazoline maleate are dissolved in 1000 milliliters of aqueous 0.5 percent hydroxypropylmethyl cellulose and the mixture is filtered, poured into vials, sealed and sterilized. Intravenous injection of five cubic centimeters of this composition to an arrhythmic mammal provides a dosage of 50 milligrams of the active ingredient.

EXAMPLE 9

Five grams of 1 - [2 - (4 - amino-2,6-dibromophenoxy) ethyl]-4-methylpiperazine dihydrochloride are dissolved in 1000 cubic centimeters of normal saline solution containing 0.5 percent of chlorobutanol as a preservative. The solution is filtered, filled into vials, sealed and sterilized in an autoclave to obtain a sterile injectable composition. Ten cubic centimeters of the composition contains about 50 milligrams of the active ingredient. The composition is administered to animals exhibiting cardiac arrhythmia.

What is claimed is:

1. The method which comprises administering internally to a cardiac arrhythmic mammal an antiarrhythmic amount of a compound corresponding to the formula

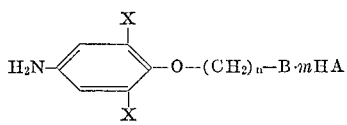

wherein X represents a member of the group consisting of chlorine, bromine and iodine, B represents a member of the group consisting of 2-imidazolin-2-yl, piperazin-1-yl and 4-methylpiperazin-1-yl, $n$ represents one of the integers 1 and 2, $m$ represents one of the integers 0, 1 and 2 and HA represents a chemical equivalent of a pharmaceutically-acceptable acid.

2. The method of claim 1 wherein B represents 2-imidazolin-2-yl.

3. The method of claim 1 wherein B represents 4-methylpiperazin-1-yl.

4. The method of claim 1 wherein X represents bromine.

5. A composition adapted for internal administration to cardiac arrhythmic mammals comprising a pharmaceutical carrier having incorporated therein an antiarrhythmic amount of a compound corresponding to the formula

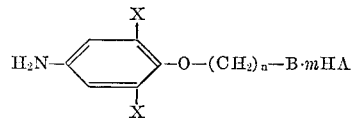

wherein X represents a member of the group consisting of chlorine, bromine and iodine, B represents a member of the group consisting of 2-imidazolin-2-yl, piperazin-1-yl and 4-methylpiperazin-1-yl, $n$ represents one of the integers 1 and 2, $m$ represents one of the integers 0, 1 and 2 and HA represents a chemical equivalent of a pharmaceutically-acceptable acid, said antiarrhythmic amount being sufficient upon internal administration to cardiac arrhythmic mammals to provide a concentration of said compound in the animal cardiovascular system sufficient to alleviate cardiac arrhythmia.

6. The method of claim 1 wherein the compound is administered parenterally.

7. The method of claim 6 wherein the compound is administered intravenously.

8. The method of claim 1 wherein the compound is administered orally.

References Cited

UNITED STATES PATENTS

| | | | |
|---|---|---|---|
| 3,389,171 | 6/1968 | White | 260—501.17 |
| 3,419,591 | 12/1968 | Harrison | 260—440 |

ALBERT T. MEYERS, Primary Examiner

D. M. STEPHENS, Assistant Examiner

U.S. Cl. X.R.

260—268, 309.6; 424—273